United States Patent [19]

Sugo et al.

[11] Patent Number: 5,783,608
[45] Date of Patent: Jul. 21, 1998

[54] PROCESS FOR PRODUCING SEPARATION FUNCTIONAL FIBERS AND ION-EXCHANGE FIBERS PRODUCED THEREFROM

[75] Inventors: Takanobu Sugo, Gunma-ken; Toshihiko Yamada, Chiba-ken; Hiroyuki Shima; Kunio Fujiwara, both of Kanagawa-ken, all of Japan

[73] Assignees: Ebara Corporation; Japan Atomic Energy Research Institute, both of Tokyo, Japan

[21] Appl. No.: 804,520

[22] Filed: Feb. 21, 1997

Related U.S. Application Data

[63] Continuation of Ser. No. 474,987, Jun. 7, 1995, abandoned.

[30] Foreign Application Priority Data

Nov. 22, 1994 [JP] Japan ................ 6-288435

[51] Int. Cl.$^6$ .................................................... C08J 5/20
[52] U.S. Cl. .......................... 521/29; 521/31; 521/33; 521/34; 522/127; 522/130; 522/146; 522/161; 525/286; 525/291
[58] Field of Search .................. 521/33; 525/286, 525/291

[56] References Cited

U.S. PATENT DOCUMENTS

| | | |
|---|---|---|
| 3,247,133 | 4/1966 | Chen . |
| 3,723,306 | 3/1973 | Bridgeford . |
| 3,933,607 | 1/1976 | Needles et al. . |
| 3,985,501 | 10/1976 | Grot . |
| 4,012,303 | 3/1977 | D'Agostino et al. . |
| 4,113,666 | 9/1978 | Sano et al. . |
| 4,164,600 | 8/1979 | Yung ................................ 426/198 |
| 4,331,541 | 5/1982 | Akiyama et al. . |
| 4,346,142 | 8/1982 | Lazear . |
| 4,376,794 | 3/1983 | Machi et al. . |
| 4,385,130 | 5/1983 | Molinski et al. . |
| 4,605,454 | 8/1986 | Sayovitz ............................ 156/73.1 |
| 4,608,393 | 8/1986 | Hamano . |
| 4,766,036 | 8/1988 | Vaughn et al. . |
| 4,770,925 | 9/1988 | Uchikawa ......................... 428/219 |
| 4,874,666 | 10/1989 | Kubo ................................ 428/398 |
| 4,908,052 | 3/1990 | Largman ........................... 55/486 |
| 5,064,866 | 11/1991 | Toyomoto et al. . |
| 5,071,880 | 12/1991 | Sugo ................................ 521/27 |
| 5,133,864 | 7/1992 | Vaughn et al. . |
| 5,167,765 | 12/1992 | Nielsen ............................ 162/46 |
| 5,176,833 | 1/1993 | Vaughn et al. . |
| 5,182,162 | 1/1993 | Andrusko ......................... 428/219 |
| 5,308,467 | 5/1994 | Sugo ................................ 201/301 |
| 5,314,922 | 5/1994 | Takai . |
| 5,425,866 | 6/1995 | Sugo et al. . |

FOREIGN PATENT DOCUMENTS

| | | |
|---|---|---|
| 0596441A2 | 5/1994 | European Pat. Off. . |
| 4848-90969 | 6/1973 | Japan . |
| 57-073027 | 5/1982 | Japan . |
| 57-073028 | 5/1982 | Japan . |
| 62-083006 | 4/1987 | Japan . |
| 1258740 | 10/1989 | Japan . |
| 261497 | 12/1990 | Japan . |
| 4187248 | 7/1992 | Japan . |
| 580941 | 11/1993 | Japan . |

OTHER PUBLICATIONS

Abstract of Japanese Publication No. 05-000032, Jan. 8, 1993.

Furusaki, S. et al, "Development of Hollow-Fiber Filtration Membrane by Radiation-Induced Graft Polymerization", Chemical Engineering, Jul. 1987, pp. 17-20.

Hashida et al, "Adsorption of hydrogen chloride on porous resins with different functional groups", Nihon Kagaku Kaishi (Bulletin of Japan Chemistry Association), No. 3, 1985, pp. 569-571.

Hashida et al, "Adsorption of gases on ion exchange resins", Kagaku No Ryoiki (The Domain of Chemistry), 25-10, 1970, pp. 932-939.

Kamata et al, "Adsorption of ammonia on macroreticular ion-exchange resins", Kogyo Kagaku Zasshi (Industrial Chemical Magazine), vol. 73-6, 1970, pp. 1083-1087.

R. Kunin, "Ion Exchange Resins"(1990) 113, Krieger (Malabar, FL).

*Primary Examiner*—Fred Zitomer
*Attorney, Agent, or Firm*—Browdy and Neimark

[57] ABSTRACT

Separation functional fibers are produced by exposing fibers with a core/sheath structure to an ionizing radiation and then grafting a polymerizable monomer to the fibers. Ion-exchange fibers are produced by introducing, through radiation-initiated graft polymerization, ion-exchange groups into the sheath of each of composite fibers the core and the sheath of which are composed of different kinds of high-polymer components. The separation functional fibers and the ion-exchange fibers are useful in various applications such as the production of pure water in electric power, nuclear, electronic and pharmaceutical industries and the demineralization of high-salt content solutions in the production of foods and chemicals. The fibers are also useful in removing harmful components from gases, as well as odorous components such as ammonia.

9 Claims, 9 Drawing Sheets

CONCENTRIC TYPE

ECCENTRIC TYPE

ISLANDS-IN-SEA TYPE

Fig. 7
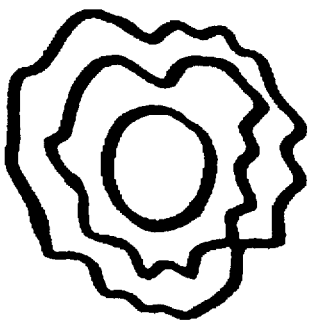
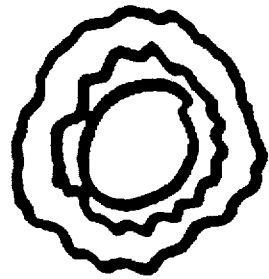
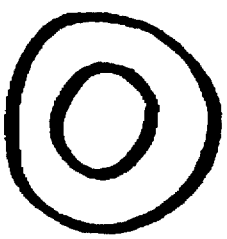

PROCESS FOR PRODUCING SEPARATION FUNCTIONAL FIBERS AND ION-EXCHANGE FIBERS PRODUCED THEREFROM

FIELD OF THE INVENTION

This application is a continuation of application Ser. No. 08/474,987, filed Jun. 7, 1995, now abandoned.

This invention relates to the production of separation functional fibers by radiation-initiated graft polymerization, as well as ion-exchange fibers and gas or ion adsorbers that are produced from said functional fibers.

BACKGROUND OF THE INVENTION

Cleanrooms are essential to high-technology sectors including semiconductor fabrication, precision machine engineering, photographic industry, the production of pharmaceuticals and biological cleanrooms in medical institutions such as hospitals and the use of cleanrooms has expanded to the food industry and agricultural fields, as well as to their peripheral areas. While humidity, moisture and air streams are important environmental conditions in those industrial sectors, air purification is no less important. To purify air used in those sectors, HEPA (high-efficiency particulate air) filters composed of glass fibers and more efficient ULPA (ultra-low penetration air) filters are used. Neutral fibers, coarse dust filters, etc. that are composed of synthetic fibers other than glass fibers are extensively used as pre-filters to those high-efficiency filters. The filters mentioned above are mainly intended to remove particles, so they are designed to be capable of efficient removal of fine particles about 0.1 μm in size. However, they are incapable of removing gases and ions.

The contamination of wafer surfaces in operating LSI fabrication plates is believed to occur due not only to fine particles but also to gases and ions. Contamination by gases and ions causes serious problems by increasing the contact resistance or affecting the bulk characteristics of wafers. Contaminating gases and ions can originate in various ways, such as in fabrication steps such as etching, from materials finished in cleanrooms and during the introduction of ambient atmosphere. Although the air in cleanrooms is constantly circulated, gases and ions once generated are not removed by the air purification system, so it is suspected that accumulating gases and ions may affect not only the quality of the final products but also the health of operating personnel.

Separation functional fibers or ion-exchange fibers produced therefrom are capable of effective adsorptive separation of heavy metal ions such as cobalt, nickel, mercury and copper ions contained in the process water used in precision electronics industry, medical field, pharmaceutical industry, nuclear power generation and food industry, as well as in the waste water discharged from these fields (see Japanese Patent Public Disclosure No. Hei 5-111685). According to Japanese Patent Publication No. Hei 5-67325, Japanese Patent Public Disclosure Nos. Hei 5-111607 and Hei 6-142439, filters made of ion-exchange fibers are capable of removing not only fine particles but also $H_2S$, $NH_3$, carbon dioxide and hydrogen fluoride in gases. However, these prior fibers do not provide an adequately efficient removal of such substances from the gases.

A process for the production of ion-exchange fibers is described in Japanese Patent Publication No. 6-20554, corresponding to U.S. Ser. No. 08/264,762, which gives examples of adsorbing hydrogen chloride and ammonia in air atmosphere by means of the ion-exchange fibers. It would be desirable, however, to provide a more efficient adsorption of hydrogen chloride and ammonia.

The rate of adsorption and ion-exchange increases as the surface area and the density of functional groups in the surface increase. This is because adsorption and ion-exchange reactions always start at surfaces of the fibers and move gradually to the interior. In other words, one cannot say that the functional groups within the fibers are fully utilized. Hence, it is advantageous for the purposes of adsorption and ion-exchange that functional groups be densely present on surfaces of the fibers.

Due to the ease in controlling the site of the graft polymerization, radiation-initiated graft polymerization is attractive as a process for the production of functional materials and ion-exchange fibers and adsorbents produced by this method are under review. Radiation-initiated graft polymerization is commonly performed by a pre-irradiation liquid-phase process in which a substrate is first exposed to an ionizing radiation and then immersed in a monomer solution for reaction. In the early stage of the reaction, graft polymerization occurs in molecules at the surface of the substrate and its nearby area and progresses into the interior as the reaction time passes. However, it is difficult to insure that graft polymerization takes places in the surface of the substrate and its nearby area at an adequately high graft ratio in excess of 100%. This is also true with vapor-phase graft polymerization, which progresses into the substrate at high graft ratio. Hence, it has been difficult, even by radiation-initiated graft polymerization, to produce fibrous functional materials that have functional groups such as ion-exchange groups concentrated on the surface.

Another problem with the progress of reaction into the substrate in radiation-initiated graft polymerization is that if the substrate is formed of polypropylene, its physical strength decreases and it may undergo oxidative deterioration to release decomposition products. The most pertinent known prior art in this regard is a process for producing a gas adsorbent that has ion-exchange groups introduced into a polypropylene fiber substrate without a core-sheath structure by radiation-initiated graft polymerization (see Japanese Patent Publication No. Hei 6-20554).

Generally speaking, the larger the surface area of materials such as ion-exchangers and adsorbers that have separating capability, the higher the rate of exchange or adsorption and, hence, the more advantageous. Hence, the frequency of using ion-exchangers and adsorbers in the form of fibers having large surface areas is increasing. To take ion-exchange fibers as an example of fibrous materials having separating capability, there are known fibers of a multi-core structure comprising a polystyrene matrix or sea and polyethylene multi-filament cores or islands within the matrix, in which ion-exchange groups have been introduced into the matrix, and polyvinyl alcohol fibers having ion-exchange groups introduced therein after firing.

Example 3 of Japanese Patent Public Disclosure No. Hei 5-64726 shows that excellent results were attained when composite fibers comprising a polypropylene core and a polyethylene sheath, grafted by styrene monomer and then converted, were used as ion exchange fibers in an electrically regenerating desalinator; therefore, it is clear that ion-exchange fibers of a core-sheath structure exhibit high performance even in an electrically regenerating desalinator. However, if fibers having the polypropylene core are used in air, the polypropylene core will experience a drop in strength while undergoing decomposition, but researchers have shown that stability in air atmosphere can be attained by replacing the polypropylene with polyethylene terephthalate having high resistance to radiations and oxidation.

Most of the gas adsorbing filters known in the art are made from activated charcoal or zeolite treated with chemicals or supports carrying manganese oxides. Recently, gas adsorbing filters made from ion-exchange fibers have been developed for use in cleanrooms. The filter proposed in Japanese Patent Application No. Hei 4-294501 uses ion-exchange fibers of high-polymer resins that have been produced by radiation-initiated graft polymerization and it has proved to be very effective when used in cleanrooms.

Japanese Patent Application No. Hei 4-294501, supra, teaches a method of purifying micro-contaminated air in cleanrooms using nonwoven fabric filters made of high-polymer ion-exchange fibers produced by radiation-initiated graft polymerization. That patent gives examples of using a nonwoven fabric of polypropylene fibers and a nonwoven fabric of a composite of polyethylene and polypropylene as the substrate to be treated by ionizing radiations; however, both polypropylene and polyethylene are prone to generate acidic substances under irradiation and in the presence of oxygen and, furthermore, they are susceptible to deterioration and dusting under irradiation.

In the years to come, cleanrooms will certainly be required to meet more strict standards on the cleanliness of air than permissible today, so the generation of dust and gaseous substances from the filter per se will obviously be a greater problem than it is today. To deal with this situation, the present invention adopts a core/sheath structure in which the core is made of a high-polymer component that is less prone to generate radicals and/or undergo degradation upon exposure to ionizing radiations, with the sheath being formed of a high-polymer component that is apt to generate radicals upon irradiation.

SUMMARY OF THE INVENTION

An object of the present invention is to provide a process for producing separation functional fibers by radiation-initiated graft polymerization that have functional groups introduced densely at their surfaces and which will experience less physical and chemical deteriorations.

Another object of the invention is to provide ion-exchange fibers produced from said separation functional fibers.

A further object of the invention is to provide an ion or gas adsorber from said separation functional fibers. The separation functional fibers of the present invention and ion-exchange fibers produced therefrom permit more efficient removal of gaseous pollutants in gases. Therefore, in a first aspect, the present invention relates to gas or ion adsorbents that are capable of purifying the air in cleanrooms that has been contaminated not only with fine particles but also with gases and ion present in small quantities.

The first object of the invention is attained by a process for producing separation functional fibers that comprises the steps of exposing fibers with a core/sheath structure to an ionizing radiation and then grafting a polymerizable monomer onto the fibers, so as to provide fibers which may have any of a variety of properties, including ion-exchange properties, chelating properties, etc.

The second or third object of the invention is attained by ion-exchange fibers or a gas or ion adsorber that are produced by introducing, through radiation-initiated graft polymerization, ion-exchange groups into the sheath of each of composite fibers the core and the sheath of which are composed of different kinds of high-polymer components.

BRIEF DESCRIPTION OF THE DRAWINGS

FIG. 7 shows how the sheath of a fiber that had been subjected to graft polymerization separated progressively from the core as the dimensions of the two parts increased due to the introduction of functional groups into the sheath;

DETAILED DESCRIPTION OF THE INVENTION

The present invention will now be described in detail.

Figure 1A:
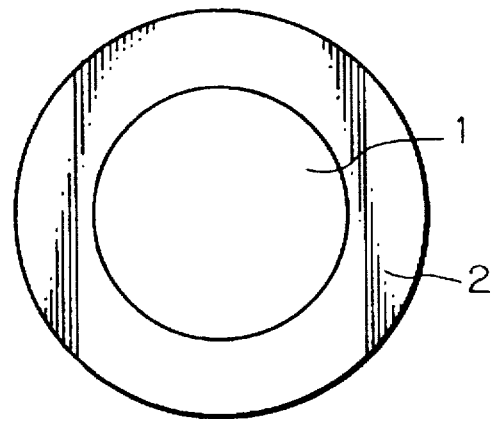
FIGS. 1a–1c are cross sections of fibers having three different types of a core/sheath structure according to the invention.
Figure 1B:
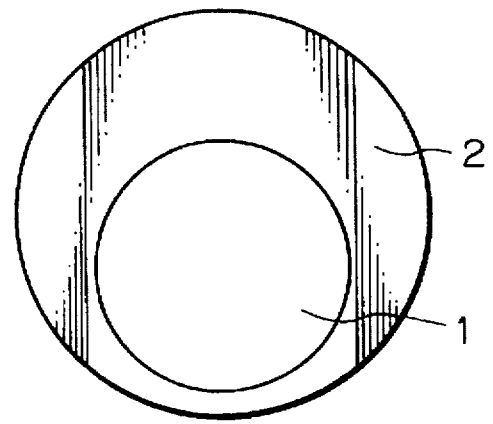
Figure 1C:
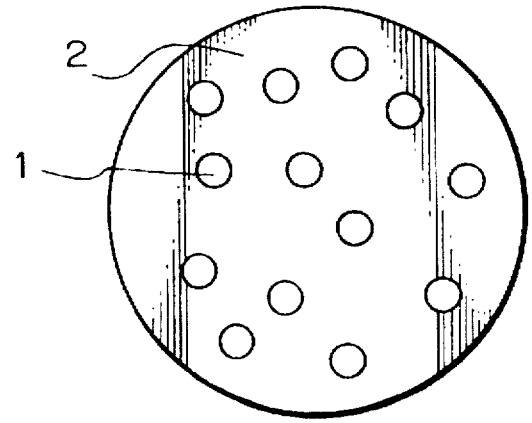

FIGS. 1a–1c are cross section of fibers having three different types of a core/sheath structure according to the invention. As shown, fibers of a core/sheath structure consist basically of a core 1 that is surrounded by a sheath 2; the core 1 and the sheath 2 may be concentric (FIG. 1a) or eccentric (FIG. 1b); alternatively, the sheath 2 forming the sea or matrix may be interspersed with cores 1 forming islands (FIG. 1c).

In fibers having these core/sheath structures, the sheath is preferably formed of a material which is capable of generating radicals upon exposure to ionizing radiation, whereas the core is preferably formed of a material that is less prone to the generation of radicals and/or the degradation of high-polymer upon exposure to an ionizing radiation.

Additionally, the core material has preferably a higher melting point than the sheath material because fibers of a core/sheath structure can be processed into a nonwoven fabric by thermal fusion. Since the individual fibers are fused at their sheaths, the generation of particles such as fiber fragments is the least prone to occur. This is a very important characteristic for the treatments of water and air that are to be employed in precision electronics industry, nuclear power generation and other industrial sectors in which the present invention is to be employed.

Specifically, the sheath is preferably made of polyolefinic materials because it must be formed of materials that are suitable for radiation-initiated graft polymerization. Suitable examples include polyolefins typified by polyethylene and polypropylene, halogenated polyolefins typified by polyvinyl chloride and polytetra-fluoroethylene (PTFE), copolymers of olefins and halogenated polyolefins typified by an ethylene-tetrafluoroethylene copolymer, and copolymers of olefins and other monomers such as an ethylene-vinyl alcohol or ethylene-vinyl acetate copolymer (EVOH or EVA). Polyethylene is particularly advantageous for use as the sheath component of ion-exchange fibers.

The core material may be selected from among materials that differ from the selected sheath material, and it is preferably such that the fiber strength can be maintained even after radiation-initiated graft polymerization on the core. While polyolefin core materials can be used, particularly suitable core materials are polyesters typified by polyethylene terephthalate and polybutylene terephthalate.

Exemplary combinations of core and sheath materials include polyethylene (sheath)/polypropylene (core) and polyethylene (sheath)/polyethylene terephthalate (core), with the latter combination, although not limited thereto, being particularly preferred since it assures high radiation resistance.

Fibers having a core/sheath structure have preferably a sheath to core weight ratio in the range from 0.1 to 10. If the sheath to core weight ratio is less than 0.1, the graft ratio of the sheath must be increased to a very high level in order to ensure an adequate amount of functional groups, but then the fiber strength is so much reduced that it is no longer possible to maintain the core/sheath structure of the fiber. If the sheath to core weight ratio exceeds 10, the fiber is practically of a single structure in that it is essentially composed of the sheath and there is no merit in adopting the core/sheath structure.

When the sheath of a fiber having a core/sheath structure is subjected to graft polymerization, the dimension of the sheath increases causing it to separate from the core (see FIG. 7). Before grafting, there is no gap between the core and the sheath but after graft polymerization, a gap forms between the core and the sheath, causing creases to develop in the sheath. After the introduction of functional groups, the gap widens further and the creases will expand.

Figure 9:
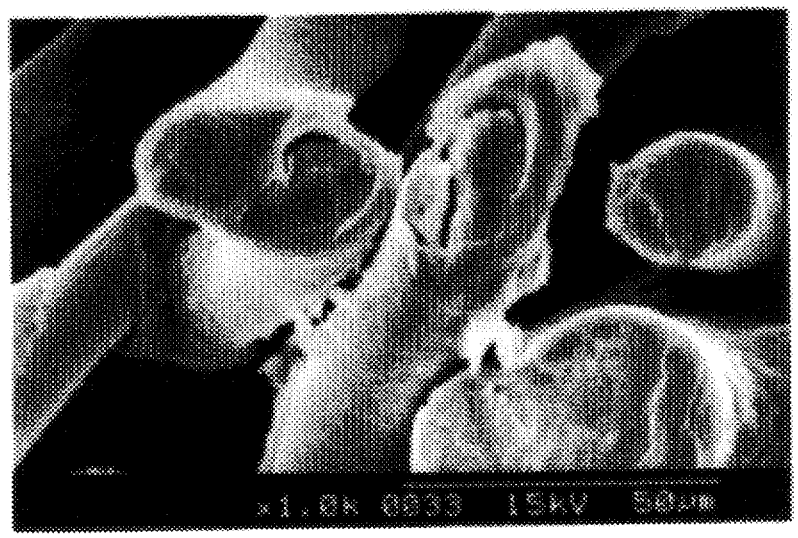
FIG. 9 is an electron micrograph showing in cross section the composite fibers after graft polymerization.
Figure 10:
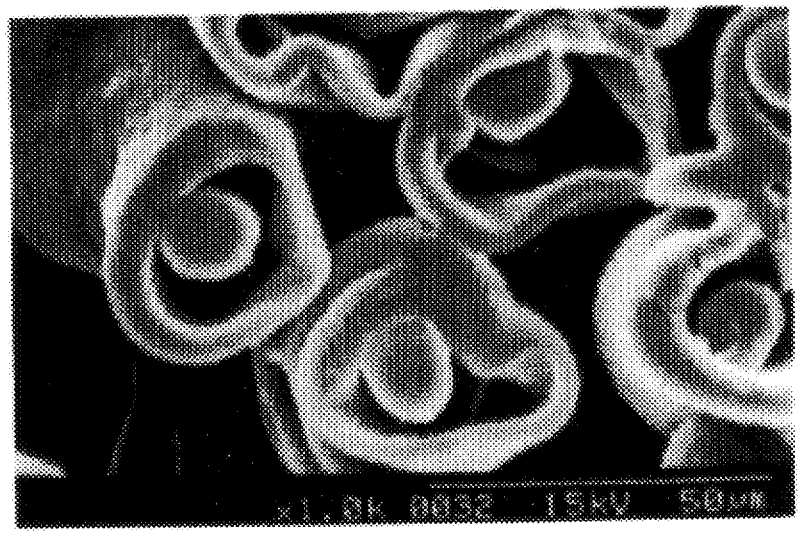
FIG. 10 is an electron micrograph showing a cross section of the composite fibers that were sulfonated after graft polymerization.
Figure 11:
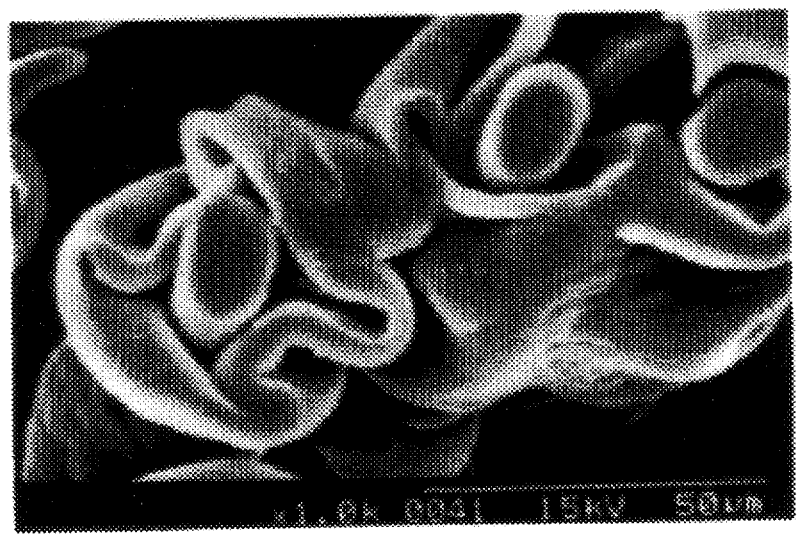
FIG. 11 is an electron micrograph showing a cross section of the composite fibers that were aminated after graft polymerization.

FIGS. 8–11 are electron micrographs showing in cross section a plurality of composite fibers each consisting of a polyethylene terephthalate (PET) core and a polyethylene (PE) sheath before grafting (FIG. 8), after grafting ca. 116% of glycidyl methacrylate (FIG. 9), followed by sulfonation (FIG. 10) or amination (FIG. 11).

After grafting, the sheath has many nodes present, which is in sharp contrast with the smooth surface that was observed before grafting. With the presence of many undulations on its surface, the sheath has an increased surface area, which is not only preferred for the purpose of improving the rate of adsorptive separation but also instrumental to the enhanced effectiveness in physical trapping of fine particles. It should be added that the separation between the core and the sheath helps enhance the ability of the fibers, taken as a whole, to retain water. This property is advantageously utilized to prevent performance deterioration due to drying when the separation functional fibers of the invention, in particular, ion-exchange fibers prepared therefrom are assembled into an air filter that is used to remove deleterious gases such as acidic and alkaline gases. Grafting to the sheath will somewhat deteriorate its physical strength but the overall strength of the fiber is maintained by the core.

The fibers having a core/sheath structure may be long or short fibers. The invention is also applicable to woven or nonwoven fabrics which are fiber assemblies, as well as to articles prepared by processing such woven or nonwoven fabrics.

The substrate, or fibers having a core/sheath structure, may be subjected to radiation-initiated graft polymerization in the following manner.

In the first plate, various sources of radiation may be employed, such as α-rays, β-rays, γ-rays, electron beams, X-rays and ultraviolet rays, with γ-rays and electron beams being particularly suitable for the purposes of the invention. The preferred radiation dose is from 20 to 300 kGy. Below 20 kGy, radicals will not be generated in a sufficient amount to initiate the intended reaction.

Above 300 kGy, the intensity of radiation deterioration increases and the cost of irradiation will also increase.

A method of graft polymerization in which the substrate that has been given pre-exposure of a radiation is brought into contact with a polymerizable monomer is commonly referred to as "pre-irradiation graft polymerization". Compared to "simultaneous irradiation" in which the substrate is exposed to a radiation in the presence of a monomer, pre-irradiation graft polymerization produces a smaller amount of copolymer and, hence, is suitable for use in the manufacture of separation functional fibers of the type contemplated by the invention.

A process in which an irradiated substrate is subjected to graft polymerization as it is immersed in a monomer solution is commonly referred to as "liquid-phase graft polymerization" and may suitably be performed at a reaction temperature of 20°–60° C. for a reaction time of 2–10 h.

Impregnation graft polymerization is a process in which an irradiated substrate is impregnated with a pre-determined amount of monomer and allowed to react either in vacuum or in an inert gas; this process is suitably performed at a reaction temperature of 20°–60° C. for a reaction time of 0.2–8 h. After graft polymerization by this process, the substrate is in a dry state and this offers several advantage such as ease in handling the substrate and reduced emission of liquid wastes.

Vapor-phase graft polymerization which involves contact between an irradiated substrate and a monomer vapor is only applicable to monomers having comparatively high vapor pressures and uneven grafting is prone to occur; on the other hand, it offers several advantages such as reduced emission of liquid wastes and the availability of a dry substrate as obtained by graft polymerization. When vapor-phase graft polymerization is to be performed, a reaction temperature of 20°–80° C. and a reaction time of 2–10 h are required.

Any one of these radiation-initiated graft polymerization processes is applicable in the present invention. Polymerizable monomers may be ones having various functions in themselves or those which can be provided with certain functions by a secondary reaction after grafting. Take, for example, the case of ion-exchange fibers: exemplary monomer having ion-exchange groups include acrylic acid, methacrylic acid, sodium styrenesulfonate, sodium methallylsulfonate and sodium allylsulfonate and these need only to be subjected to graft polymerization to produce ion-exchange fibers.

Examples of the monomers into which ion-exchange groups can be introduced by carrying out a further reaction after graft polymerization include acrylonitrile, acrolein, vinylpyridine, styrene, chloromethylstyrene and glycidyl methacrylate. To take styrene graft polymers as an example, sulfonic groups can be introduced into these polymers by means of sulfonating chemicals such as chlorosulfonic acid and sulfuric acid.

While the foregoing description assumes that the process of the present invention for producing separation functional fibers is mainly applicable to ion-exchange fibers, it should be noted that the invention is also applicable to other products including heavy metal adsorbents having chelate groups, catalysts and affinity chromatographic carriers.

The following examples are provided for the purpose of further illustrating the present invention but are in no way to be taken as limiting.

EXAMPLE 1

A nonwoven fabric (areal density, 50 g/m$^2$) formed of composite fibers (av. dia. 20 μm) consisting of a polypropylene core and a polyethylene sheath (core-to-sheath weight ratio=1) was irradiated with 200 kGy of γ-rays in a nitrogen atmosphere and dipped in an aqueous solution of 50% acrylic acid. By 6-h reaction at 40° C., grafting was accomplished to 53%. The thus treated fibers had an ion-exchange capacity of 4.8 meq/g.

The fibers were converted to an Na form with sodium hydroxide and examined for their cross section with an X-ray microanalyzer; sodium was found to be distributed only in the polyethylene sheath.

Figure 2:
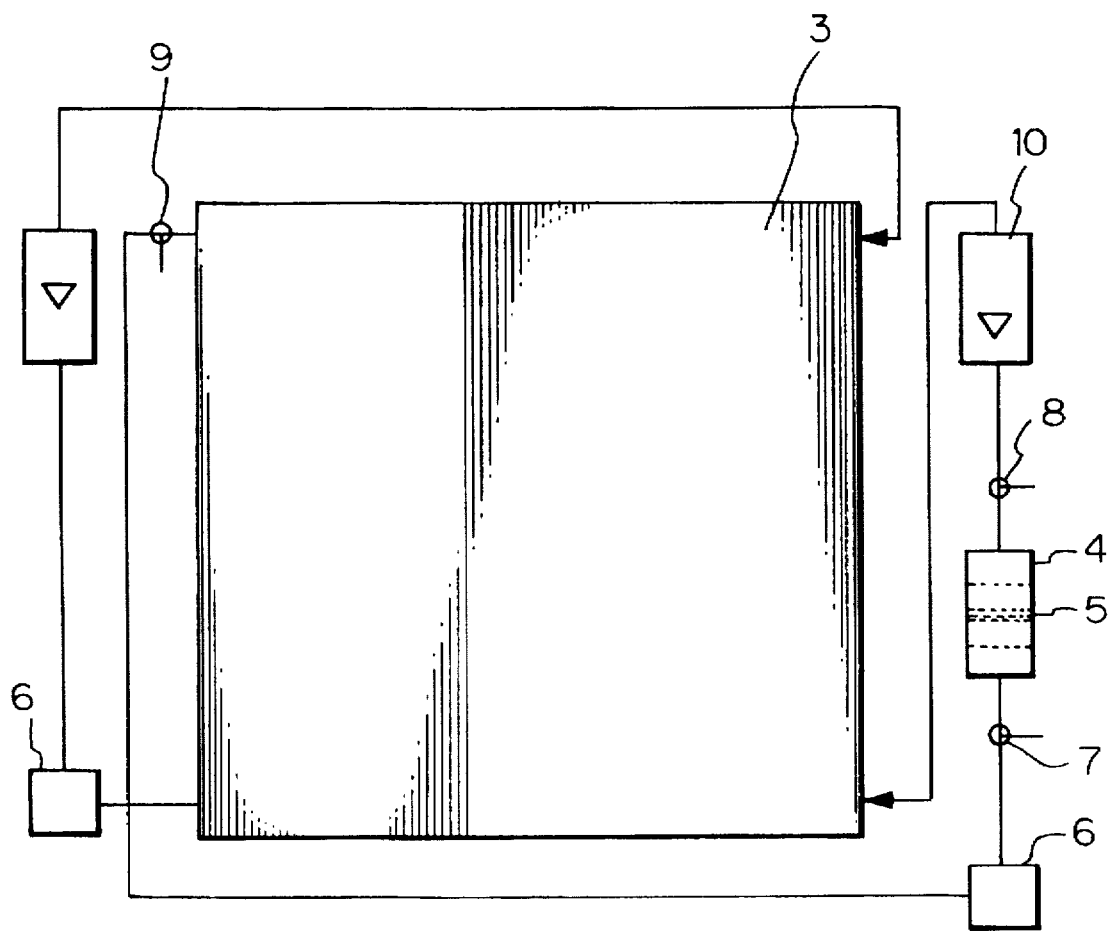
FIG. 2 is a diagram showing schematically the experimental setup for gas adsorption used in the examples of the invention.

The nonwoven fabric (H form) was punched to a disk with a diameter of 20 mm and 0.4 g of the fabric was packed in a glass column in the experimental gas adsorption setup shown in FIG. 2. A test for removing ammonia gas was conducted as it was circulated at a rate of 3 L/min.

Shown by 3 in FIG. 2 was a fluorine resin bag (40 L); 4 was the glass column (20 mmϕ) packed with the nonwoven fabric 5; 6 was a pump; 7, 8 and 9 were each a sampling analyzing portion; and 10 was a flowmeter.

Figure 3:
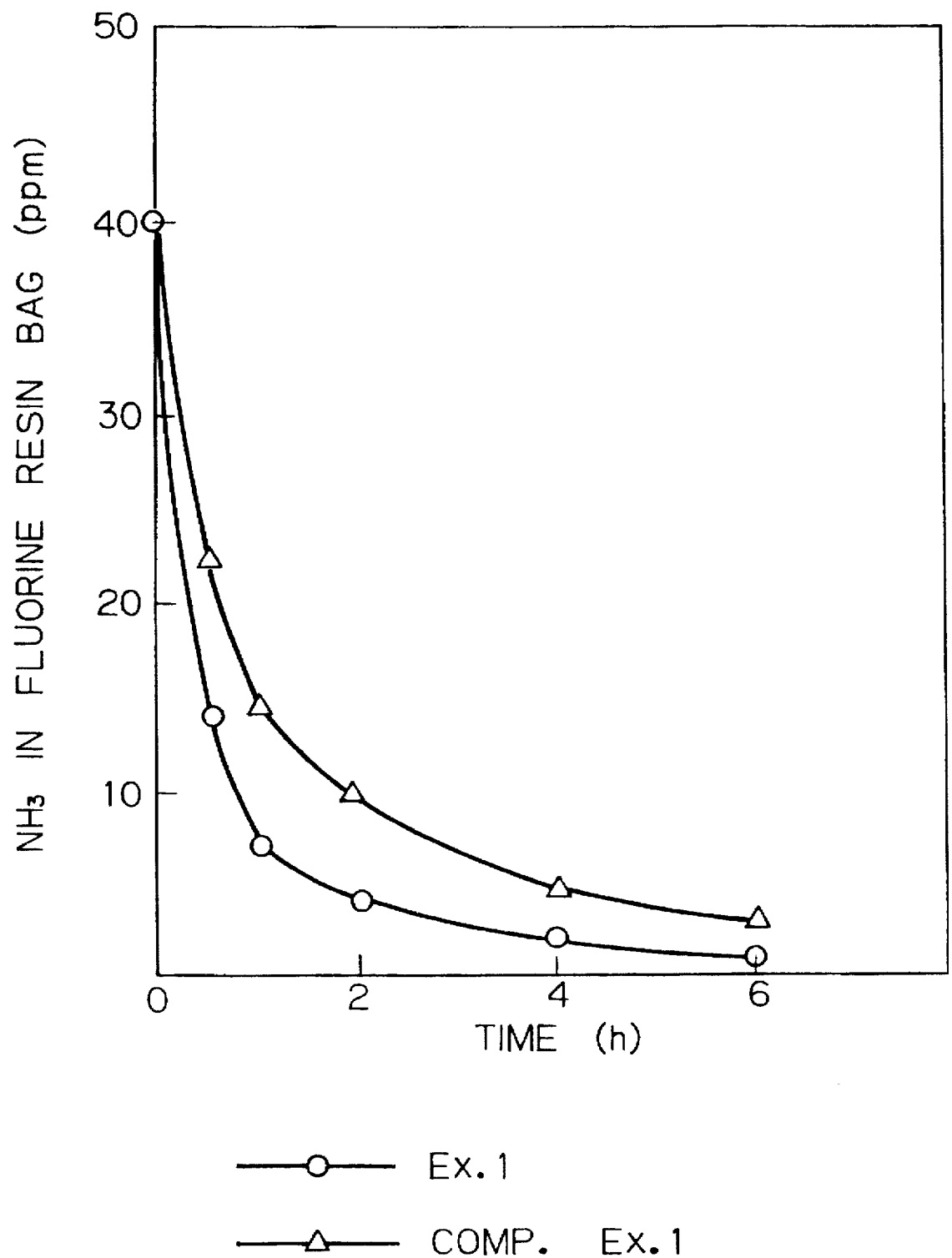
FIG. 3 is a graph showing the time-dependent change in the concentration of ammonia in the fluorine resin bag used in Example 1.

The test results are shown in FIG. 3 by a curve connecting open circles (o). As one can see from FIG. 3, the nonwoven fabric formed of the fibers of the invention insured that the ammonia concentration in the bag 3 which was initially at 40 ppm was reduced to 10 ppm or less in about 50 min and to 5 ppm or less after the lapse of 2 h.

Comparative Example 1

A nonwoven fabric (areal density, 40 g/m$^2$) solely consisting of polypropylene fibers (20 μm in av. dia.) was subjected to radiation-initiated graft polymerization with acrylic acid as in Example 1 until the graft ratio was 58%. The thus treated fibers had an ion-exchange capacity of 5.0 meq/g, with the ion-exchange groups being distributed fairly uniformly across the diameter of each fiber.

The nonwoven fabric was punched to a disk as in Example 1 and subjected to a test for the removal of ammonia gas on an experimental setup of the type shown in FIG. 2. The results are shown in FIG. 3 by a curve connecting open triangles (Δ). Obviously, it took one hour and fifty minutes for the ammonia concentration in the fluorine resin bag to decrease to 10 ppm and below.

EXAMPLE 2

A nonwoven fabric (areal density, 40 g/m$^2$) formed of composite fibers (av. dia. 20 μm) consisting of a polypropylene core and a polyethylene sheath (core-to-sheath weight ratio=1) was irradiated with 200 kGy of γ-rays in a nitrogen atmosphere and dipped in a glycidyl methacrylate/methanol (1/1) solution. By 7-h reaction at 45° C., grafting was accomplished to 138%. After the grafting, the fibers were dipped in an aqueous solution of sodium sulfite and sulfonation was conducted by 8-h reaction at 80° C. Thus, strong acidic cation-exchange fibers were obtained; they had an ion-exchange capacity of 2.42 meq/g, with almost all sulfonic groups being distributed in the sheath.

Figure 4:
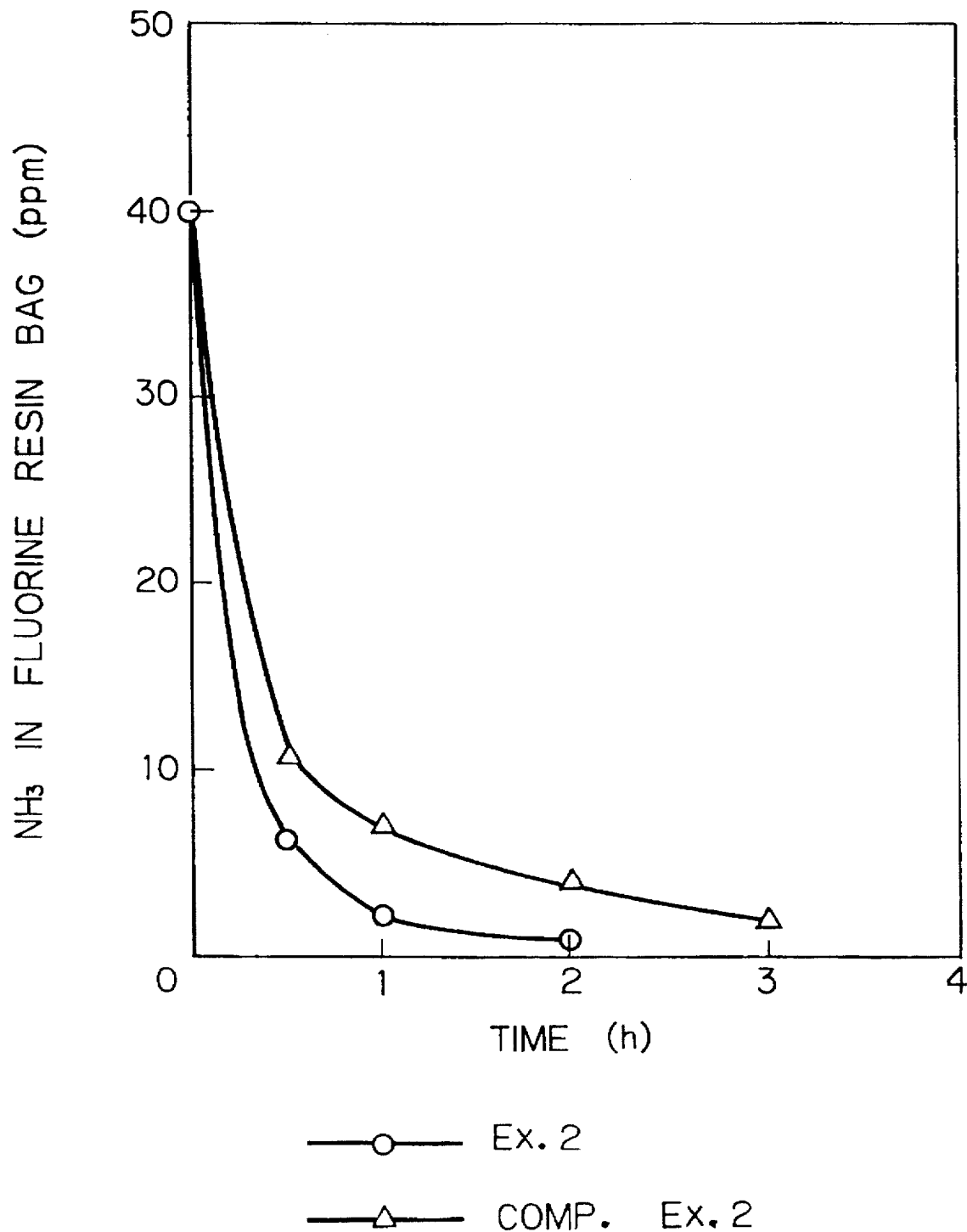
FIG. 4 is a graph showing the time-dependent change in the concentration of ammonia in the fluorine resin bag used in Example 2.

The nonwoven fabric (H form) was punched to a disk with a diameter of 20 mm and subjected to a test for the removal of ammonia gas under the same conditions as described in Example 1 using an experimental setup of the same type as shown in FIG. 2. The results are shown in FIG. 4 by a curve connecting open circles (o). As one can see from FIG. 4, the ammonia concentration in the fluorine resin bag which was initially at 40 ppm dropped to 10 ppm or less within 20 min.

Comparative Example 2

A nonwoven fabric (areal density, 40 g/m$^2$) solely consisting of polypropylene fibers (20 μm in av. dia.) was subjected to radiation-initiated graft polymerization with glycidyl methacrylate as in Example 2 until the graft ratio was 135%. By subsequent sulfonation as in Example 2, strong acidic cation-exchange fibers were obtained. They had an ion-exchange capacity of 2.45 meq/g, with the sulfonic groups being distributed fairly uniformly across the diameter of each fiber.

The nonwoven fabric was punched to a disk as in Example 2 and subjected to a test for the removal of ammonia gas on an experimental setup of the type shown in FIG. 2. The results are shown in FIG. 4 by a curve connecting open triangles (Δ). Obviously, it took 35 min for the ammonia concentration in the fluorine resin bag to decrease to 10 ppm and below.

In Example 1 and Comparative Example 1, the type of functional group was identical and the graft ratio and the ion-exchange capacity were substantially the same and this is also true in the case of Example 2 and Comparative Example 2. However, the fibers having a coresheath structure in accordance with the invention obviously exhibited better performance in the removal of ammonia gas.

EXAMPLE 3

A nonwoven fabric (areal density, 55 g/m$^2$) formed of composite fibers (av. dia. 20 μm) consisting of a polyethylene terephthalate core concentric with a polyethylene sheath (core-to-sheath weight ratio=0.7) was irradiated with 100 kGy of electron beams in a nitrogen atmosphere and subjected reaction with glycidyl methacrylate as in Example 2 to achieve a graft ratio of 116%. The thus treated nonwoven fabric was dipped in an ethylenediamine solution and subjected to reaction for 3 h at 50° C.; the nonwoven fabric now having chelate groups was capable of acid adsorption in an amount of 5.3 meq/g, with almost all chelate groups being distributed in the sheath.

Figure 5:
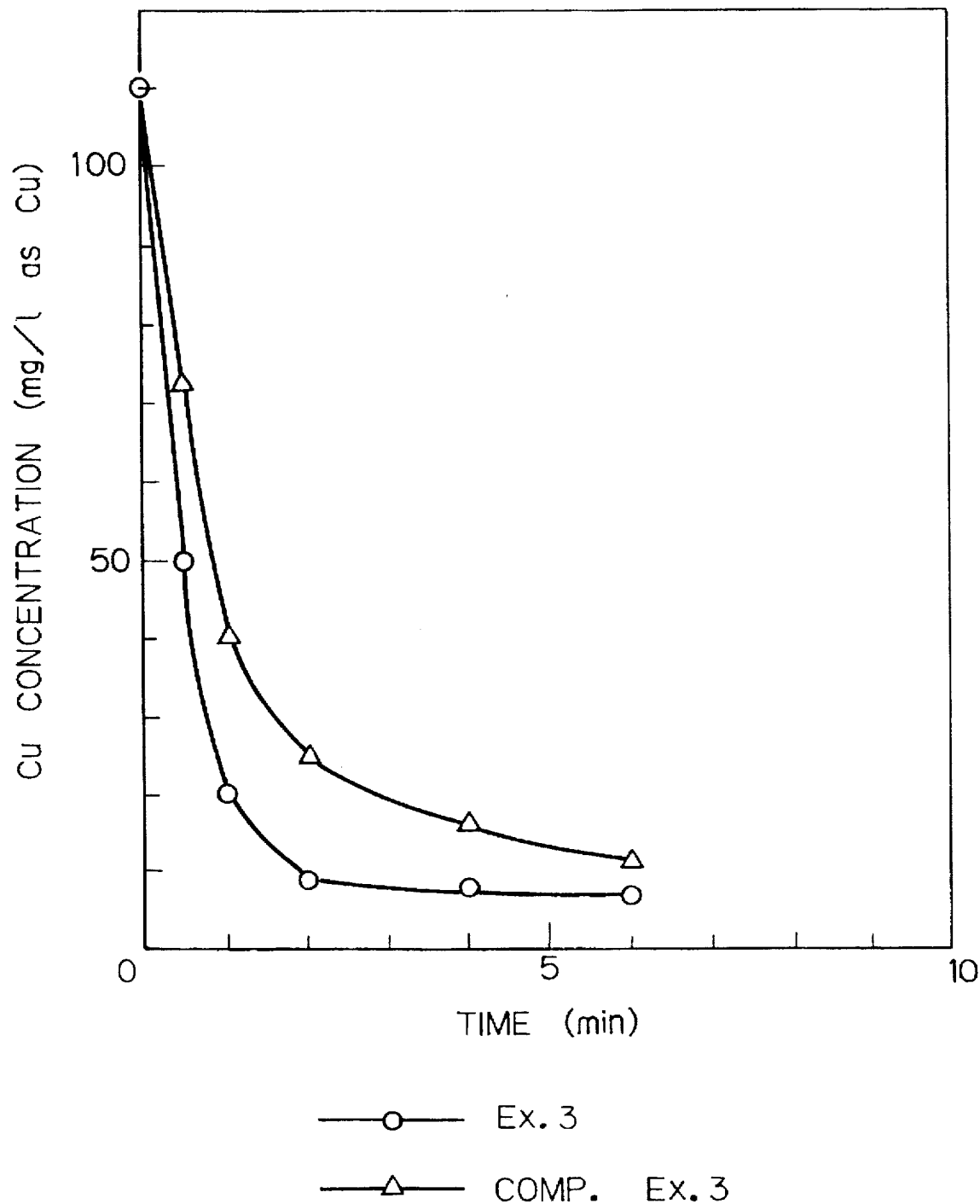
FIG. 5 is a graph showing the time-dependent change in copper concentration in Example 3.

The nonwoven fabric was then punched to a disk with a diameter of 20 mm and sampled in an amount of 0.5 g. The sampled portion was dipped in 300 ml of an aqueous solution of copper sulfate (110 mg/L as Cu) and the change in the Cu concentration was investigated over time under stirring. The results are shown in FIG. 5 by a curve connecting open circles (o). Obviously, the Cu concentration dropped to 20 mg/L as Cu in one minute.

Figure 8:
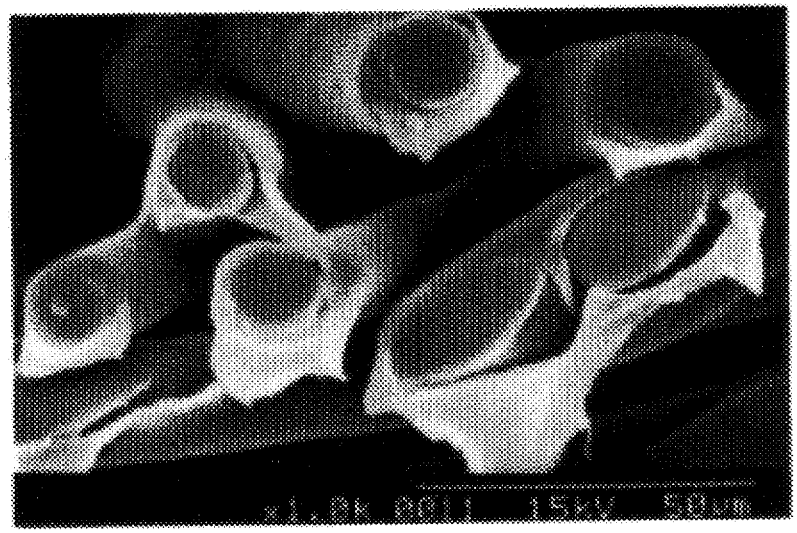
FIG. 8 is an electron micrograph showing in cross section a plurality of composite fibers each consisting of a PET core and a PE sheath that were yet to be subjected to graft polymerization.

FIG. 8 is an electron micrograph showing a cross section of the composite fibers used in Example 3 to form the substrate membrane. After grafting, the fibers became as shown in FIG. 9 and, after amination with the solution of ethylenediamine, the fibers became as shown in FIG. 11 with the sheath, at least partly separated from the core, assuming a wrinkled and non-circular cross-sectional shape.

Comparative Example 3

A nonwoven fabric (areal density, 60 g/m$^2$) solely consisting of polyethylene fibers (20 μm in av. dia.) was subjected to electron beam exposure under the same conditions as in Example 3. The non-woven fabric was then reacted with glycidyl methacrylate to achieve a graft ratio of 131%. By subsequent reaction with ethylenediamine under the same conditions, one obtained a nonwoven fabric having chelate groups that was capable of acid adsorption in an amount of 5.19 mg/g; the chelate groups were distributed uniformly along the radius of each fiber toward the center.

The nonwoven fabric was then punched to a disk with a diameter of 20 mm as in Example 3 and dipped in a solution of copper sulfate. The change in Cu concentration was investigated over time. The results are shown in FIG. 5 by a curve connecting open triangles (Δ). Obviously, the Cu concentration dropped to ca. 40 mg/L as Cu in one minute.

In Example 3 and Comparative Example 3, the graft ratio and the concentration of radical groups were almost the same and yet the fibers having a core-sheath structure in accordance with the invention obviously exhibited better performance in adsorbing heavy metals.

EXAMPLE 4

(a) A nonwoven fabric (areal density, 50 g/m$^2$) formed of fibers (dia. ca. 17 μm) consisting of a polyethylene (PE) sheath concentric with a polypropylene (PP) core was irradiated with γ-rays in a nitrogen atmosphere and subjected to graft polymerization with glycidyl methacrylate until the graft ratio was 153%.

The nonwoven fabric was then dipped in a sulfonating solution consisting of 8% sodium sulfite, 12% isopropyl alcohol and 80% H$_2$O, and subjected to a sulfonation reaction at 80° C. for 8 h. Additionally, the fabric was dipped in 7% HCl for conversion to a H form. The fibers thus produced were designated (a) PE/PP.

(b) In a separate step, a nonwoven fabric (areal density, 50 g/m$^2$) formed of fibers (ca. 17 μm in dia.) consisting of a polyethylene sheath concentric with a polyethylene terephthalate (PET) core was subjected to graft polymerization, sulfonation and regeneration in the same manner as described in (a). The fibers thus produced were designated (b) PE/PET. FIG. 10 is an electron micrograph showing a cross section of the fibers.

Figure 6:
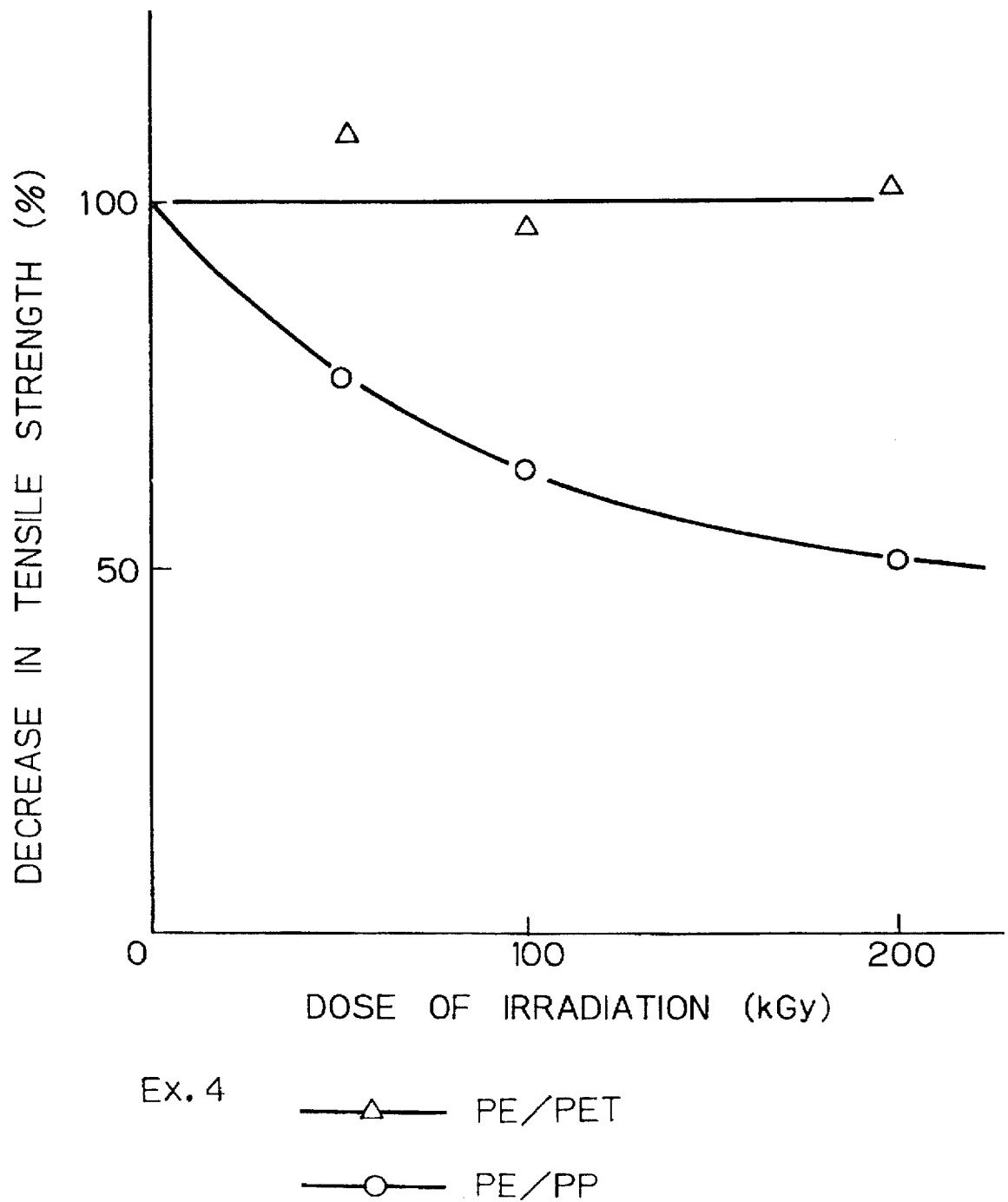
FIG. 6 is a graph showing the relationship between the dose of irradiation and the decrease in tensile strength.

The nonwoven fabrics using two fibers, (a) PE/PP and (b) PE/PET, had tensile strength vs radiation dose profiles as shown in FIG. 6. The data for the fiber (b) are indicated by a curve connecting open triangles (Δ) whereas the data for the fiber (a) are indicated by a curve connecting open circles (o). Obviously, the tensile strength of the nonwoven fabric made from fiber (b) PE/PET did not decreased with the increasing dose of irradiation.

In the next stage, tests were conducted in order to verify the release of the products of decomposition due to the chemical deterioration of fibers. It is generally difficult, even with ion exchangers based on synthetic high polymers, to avoid the oxidative deterioration of the polymer backbone chain and the subsequent formation of low-molecular weight decomposition products and elimination of functional groups and, hence, it is more desirable to develop ion exchangers having satisfactorily high resistance to these instances of chemical deterioration.

With a view to evaluating the releasability of the products of decomposition due to deterioration, the nonwoven fabric formed of fiber (a) PE/PP and that formed from fiber (b) PE/PET (each fabric measuring 20 cm×4 cm) were placed in separate containers in respective amounts of ca. 200 g; air was circulated through the containers at a rate of 1 L/min; the decomposition products in the discharged air were trapped in ultrapure water and analyzed. For evaluation of the organic, low-molecular weight decomposition products, TOC measurement was conducted. For evaluation of the releasability of ion-exchange groups, the concentration of sulfate ions was measured by ion chromatography. The results of the measurements are shown in Table 1 below.

TABLE 1

| Gas released Fiber | $SO_4^{-2}$ | | TOC | |
|---|---|---|---|---|
| | 25° C. | 65° C. | 25° C. | 65° C. |
| (a) PE/PP | <2 μg/h-kg | 96 μg/h-kg | <5 μg/h-kg | 1200 μg/h-kg |
| (b) PE/PET | <2 μg/h-kg | 5 μg/h-kg | <5 μg/h-kg | 320 μg/h-kg |

(The release is expressed as the amount of 1-h release per kg of the nonwoven fabric.)

EXAMPLE 5: Removal of SO$_2$

A nonwoven fabric of the same kind as used in Example 1 was irradiated with 200 kGy of γ-rays in a nitrogen atmosphere and dipped in a solution of glycidyl methacrylate until 150% of the substrate was impregnated with the solution. The nonwoven fabric was then put into a glass ampule, which was evacuated with a vacuum pump. Thereafter, the fabric was subjected to reaction at 45° C. for 3 h until a graft ratio of 141% was achieved. The thus treated nonwoven fabric was dipped in an aqueous solution of 30% iminodiethanol and subjected to reaction at 70° C. for 3 h, yielding a weak basic, anion-exchange nonwoven fabric having an ion-exchange capacity of 2.89 meq/g.

The fabric was then punched to a disk with a diameter of 20 mm and subjected to a test for removing sulfur dioxide (SO$_2$) by means of an experimental setup of the type used in Example 1. The concentration of SO$_2$ in the fluorine resin bag was initially 30 ppm but dropped to 1 ppm and less in 40 min.

EXAMPLE 6: Removal of CO$_2$

A nonwoven fabric of the same kind as used in Example 1 was irradiated with 200 kGy of γ-rays in a nitrogen atmosphere. Thereafter, the fabric was dipped in a solution of chloromethylstyrene (CMS) and subjected to reaction at 40° C. for 7 h until the CMS graft ratio was 112%. The fabric was then dipped in an aqueous solution of 10% trimethylamine and subjected to reaction for forming a quaternary ammonium salt at 50° C. for 3 h. The thus treated nonwoven fabric was dipped in an aqueous solution of 5% sodium hydroxide so that it was regenerated to an OH form, thereby yielding a strong basic, anion-exchange nonwoven fabric capable of decomposing neutral salts in a capacity of 2.38 mg/g.

The fabric was then punched to a disk with a diameter of 20 mm, dried in vacuum and in a nitrogen atmosphere to ensure against contact with air, packed in an experimental setup of the same type as used in Example 1 and subjected to a test for removing carbon dioxide (CO$_2$). The carbon dioxide in the fluorine resin bag was diluted to 130 ppm with pure air. Just after the start of the test, the concentration of CO$_2$ at the exit from the filter was 0 ppm and the CO$_2$ concentration in the fluorine resin bag dropped to 1 ppm and below in 50 min.

EXAMPLE 7: Removal of H₂S

A nonwoven fabric of the same kind as used in Example 6 was treated as in Example 6, packed in an experimental setup of the same type as used in Example 1 and subjected to a test for removing hydrogen sulfide ($H_2S$). The concentration of $H_2S$ in the fluorine resin bag was adjusted to 3 ppm with pure air. Right after the start of the test, the concentration of $H_2S$ at the exit from the filter was 0.0 ppm and the $H_2S$ concentration in the fluorine resin bag which was initially at 3 ppm dropped to 1 ppm or below in about 30 min.

EXAMPLE 8: Removal of NO₃

A test was conducted to remove $NO_3$ gas using a weak basic, anion-exchange nonwoven fabric of the same kind as employed in Example 6 and an experimental setup of the same type as employed in Example 1. The concentration of $NO_2$ in the fluorine resin bag was adjusted to 2 ppm with pure air. The $NO_3$ concentration in the fluorine resin bag dropped to 0.5 ppm and below in 30 min after the start of the test.

EXAMPLE 9: Removal of HF

A test was conducted to remove hydrogen fluoride (HF) gas using a weak basic, anion-exchange nonwoven fabric of the same kind as employed in Example 5 and an experimental setup of the same type as employed in Example 1. The concentration of HF in the fluorine resin bag was initially at 5 ppm and dropped to 1 ppm and below in 30 min after the start of the test. The HF concentration was 0.5 ppm or less at the exit from the filter.

According to the invention, one could produce separation functional fibers that had functional groups introduced at high density on the surface, that would experience less physical and chemical deteriorations, and that were capable of retaining satisfactory strength. The fibers had such a high capacity for separation that they were capable of gas separation or separating heavy metals from liquids within short times; hence, the fibers are useful in such applications as filters for removing gases and adsorbents of heavy metals.

Additionally, the fibers can be regenerated when used in ion-exchange applications. Hence, they can be fabricated into an ion-exchange, gas removing filter that is regenerable with regenerants if all the components including the filter frame and the separator are made of materials that will not be attacked by regenerants.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A gas adsorber produced by the steps of
   exposing fibers with a core/sheath structure to an ionizing radiation and then grafting a polymerizable monomer onto the sheath to provide a sulfonic group thereon for gas adsorption,
   wherein said sheath is a polyolefin and the core is polyester,
   whereby said sheath and said core are partially separated from one another over part of their interface and partially contact one another along their interface,
   forming a fabric from said fibers, and
   heat-bonding sheaths of adjacent fibers to one other.

2. A gas adsorber according to claim 1 wherein said polymerizable monomer is glycidyl methacrylate.

3. A gas adsorber according to claim 1 wherein said fibers with a core/sheath structure have such a cross-sectional shape such that a single core is arranged either concentric or eccentric with the sheath.

4. A gas adsorber according to claim 1 wherein said fibers with a core/sheath structure are selected from the group consisting of single fibers, processed products thereof, a woven or a nonwoven fabric which are an assembly of said single fibers, and processed products of said woven or nonwoven fabrics.

5. A gas adsorber according to claim 1, wherein said core and said sheath are separated from each other to the extent that said sheath is wrinkled and non-circular in cross-section.

6. A gas adsorber produced by the steps of exposing fibers with a core/sheath structure to an ionizing radiation and then grafting a polymerizable monomer onto the sheath;
   wherein the sheaths of said fibers are made of polyethylene and the cores of said fibers are made of polyethylene terephthalate; the polymerizable monomer is a monomer having ion-exchange groups or a monomer in which ion exchange groups can be introduced by carrying out a further reaction after graft polymerization;
   the monomer having ion-exchange groups comprises acrylic acid, methacrylic acid, sodium styrene sulfonate, sodium methallylsulfonate or sodium allylsulfonate, and
   the monomer in which ion exchange groups can be introduced by carrying out a further reaction after graft polymerization comprises acrylonitrile, acrolein, vinylpyridine, chloromethylstyrene or glycidyl methacrylate;
   wherein said sheath and said core partially contact one another along their interface and are partially separated from one another along part of their interface; and
   wherein fibers cross over one another and sheaths of adjacent fibers are heat fused together.

7. A gas adsorber according to claim 6 wherein said cores and said sheaths are separated from each other to such an extent that said sheaths are wrinkled and non-circular in cross-section.

8. A gas adsorber in the form of a non-woven fabric comprising
   a plurality of ion exchange fibers produced by introducing (1) a monomer having ion-exchange groups or (2) a monomer in which ion exchange groups are introduced by further reaction after graft polymerization, through radiation-initiated graft polymerization of said monomer, onto a sheath of a core and sheath composite fiber wherein the sheath has a lower melting point than the core, wherein a plurality of said fibers cross over one another and the sheaths thereof are thermo-fused together, wherein the core and the sheath of said fibers contact each other over only a part of their interface, the core of said fibers is made of polypropylene or polyethylene terephthalate and the sheath thereof is made of polyethylene, and wherein said monomer is glycidyl methacrylic acid when said core is polypropylene.

9. A gas adsorber according to claim 8 wherein said ion exchange groups comprise groups provided by sodium styrenesulfonate, sodium methallylsufonate or sodium allylsulfonate when said core is polyethylene terephthalate.

* * * * *